US007619180B2

(12) United States Patent
Diem

(10) Patent No.: US 7,619,180 B2
(45) Date of Patent: Nov. 17, 2009

(54) LASER HEAD OF A LASER BEAM PROCESSING MACHINE COMPRISING ALTERNATING NOZZLES

(76) Inventor: Reinhard Diem, Wilhelmstr. 62, 71083 Herrenberg (DE)

( * ) Notice: Subject to any disclaimer, the term of this patent is extended or adjusted under 35 U.S.C. 154(b) by 695 days.

(21) Appl. No.: 10/557,000

(22) PCT Filed: Jun. 17, 2004

(86) PCT No.: PCT/EP2004/006514

§ 371 (c)(1),
(2), (4) Date: Nov. 15, 2005

(87) PCT Pub. No.: WO2004/113012

PCT Pub. Date: Dec. 29, 2004

(65) Prior Publication Data

US 2007/0023405 A1    Feb. 1, 2007

(30) Foreign Application Priority Data

Jun. 25, 2003   (EP)   ................................. 03014250

(51) Int. Cl.
*B23K 20/00*   (2006.01)
*B23K 26/20*   (2006.01)
*B23K 26/36*   (2006.01)

(52) U.S. Cl. .............................. 219/121.63; 219/121.67

(58) Field of Classification Search ................................ 219/121.63–121.72, 121.77, 121.84, 121.6, 219/121.61

See application file for complete search history.

(56) References Cited

U.S. PATENT DOCUMENTS

| | | | | | |
|---|---|---|---|---|---|
| 4,032,743 | A | * | 6/1977 | Erbach et al. | ............. 219/121.7 |
| 4,467,171 | A | * | 8/1984 | Ramos | ................... 219/121.67 |
| 4,524,271 | A | * | 6/1985 | Parker | ......................... 250/233 |
| 4,728,773 | A | * | 3/1988 | Roberts et al. | ......... 219/121.77 |
| 5,055,660 | A | * | 10/1991 | Bertagna et al. | ....... 235/472.02 |
| 5,720,814 | A | * | 2/1998 | Takagi et al. | .................. 118/319 |
| 5,841,520 | A | * | 11/1998 | Taniguchi | ..................... 355/53 |
| 6,335,507 | B1 | * | 1/2002 | Nakata et al. | .......... 219/121.67 |
| 6,454,877 | B1 | * | 9/2002 | Kumar et al. | ............... 148/222 |
| 6,608,279 | B2 | * | 8/2003 | Nakata et al. | ............. 219/121.7 |

FOREIGN PATENT DOCUMENTS

| | | |
|---|---|---|
| JP | 62-254993 | 11/1987 |
| JP | 64-71590 | 3/1989 |
| JP | 6-23580 | 2/1994 |
| JP | 2000-126888 | 5/2000 |

* cited by examiner

*Primary Examiner*—Samuel M Heinrich
(74) *Attorney, Agent, or Firm*—Bachman & LaPointe, P.C.

(57) ABSTRACT

A laser head of laser beam processing machine which comprises a housing, in the interior of which a beam compartment and at the end thereof a nozzle for the laser beam and a working gas to exit are disposed. A dome-shaped nozzle head is provided on the housing and has alternating nozzles disposed on the interior. These nozzles are held rotatable about an axis of rotation and can be introduced into the beam path of the laser beam. The axis of rotation is located on an eccentric disk so that a one-off adjustment can be carried out while the nozzle head is exchanged. The nozzles on the nozzle plate can be exchanged without additional adjustment and thus also automatically, thereby avoiding the need for a complicated adjustment and handling during exchange of the nozzle.

8 Claims, 1 Drawing Sheet

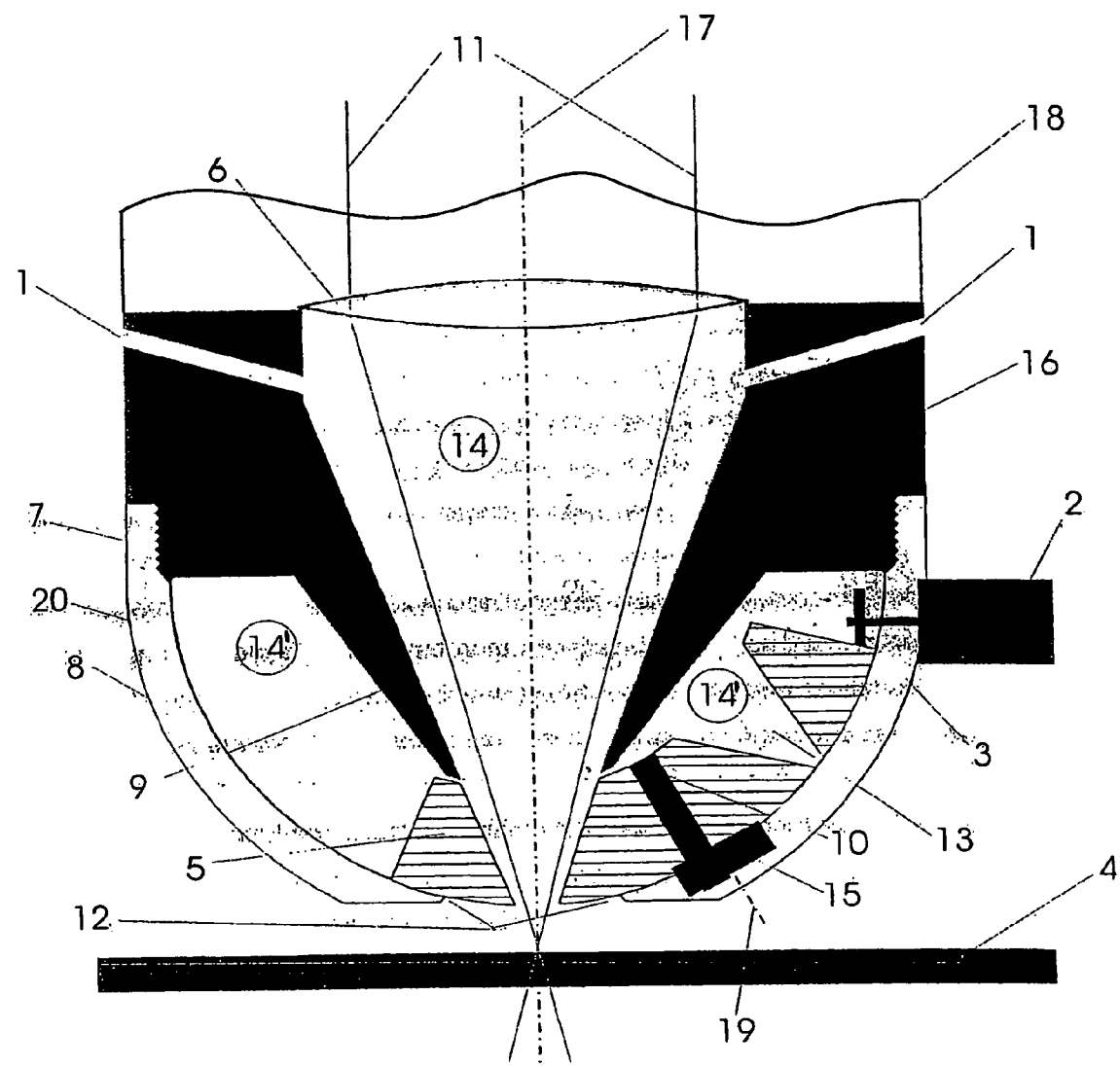

LASER HEAD OF A LASER BEAM PROCESSING MACHINE COMPRISING ALTERNATING NOZZLES

BACKGROUND OF THE INVENTION

The present invention relates to a laser head in a laser beam processing machine having a housing, in the interior of which a beam chamber is arranged and at the end of which a nozzle is arranged for the exit of the laser beam and a working gas.

Laser heads are widely known and are also referred to as welding heads, especially in the context of laser welding. In principle, however, such laser heads are used not only for welding but also to cut materials.

The laser heads (welding heads) comprise in principle a concave mirror or a lens, which focuses the laser radiation. The converging beam is guided through a beam chamber inside a housing, which is closed by a nozzle. The beam emerges through this nozzle and is focused onto the processing site. The known laser heads generally also have additional bores through which a working gas is either introduced coaxially into the beam chamber or fed via additional bores through a separate nozzle from the outside of the laser head.

When the settings of the laser head are changed, for example because of different materials or material thicknesses, for the purpose of focusing it is necessary on the one hand to adjust the optics, but on the other hand the nozzle also needs to be changed. Furthermore, contamination of the very fine nozzle can also readily take place during processing due to material splashes, so that a nozzle change is also necessary for this reason.

So that it is still possible to aim through the narrow nozzle with changed settings, and not have to change the nozzle, in various devices the focusing lenses are shifted horizontally. This, however, produces errors in the focusing because the lens is no longer illuminated centrally. The focus is therefore not optimal, which leads to inferior cutting results in laser cutting. Off-center illumination furthermore leads to stresses in the lens, so that the heat distribution and therefore the refractive index changes differently at the edges of the lens. This in turn leads to a further deterioration of the focus.

JP 64 07 1590 in this regard discloses the use of a lens disk, which comprises a plurality of lenses that can be rotated about an axis so as to be rotatable into the beam path. Although it is possible to change the lenses very quickly in this way, it is nevertheless necessary as before to fit the most expedient nozzle for the respective application.

In practice, therefore, the nozzle is unscrewed manually and a new nozzle is fastened on the housing of the welding head. This takes a relatively long time and interferes with the automatic process.

JP 62 25 4993 discloses an automatic nozzle changer which comprises a nozzle magazine. This nozzle magazine has the shape of a vertically arranged disk and a multiplicity of nozzles arranged on it. The nozzle required for the next processing step is selected on the disk by rotating the magazine, and replaced by a changer arm.

JP 06 02 3580 describes a similar device for replacing nozzles, in which the laser head moves by X-Y movement to a nozzle changer part which carries a multiplicity of different nozzles and rotates.

JP 200-126888 A discloses various configurations of alternating nozzles. In one configuration, there is a nozzle support 36 which can be rotated about a horizontal axis. There are two alternating nozzles on it, each alternating nozzle being assigned a beam channel arranged on the other side of the rotation axis, through which the laser beam crosses the nozzle support before it reaches the nozzle. Another design provides a disk-shaped nozzle support, which comprises a rotation axis extending parallel to the optical axis of the laser beam. The nozzle disk comprises merely two nozzles and rotates by means of an impact plate in which air is blown into a pressure space.

All these proposed solutions, however, are not satisfactory in use and require considerable equipment outlay for changing the nozzles with additional changer arms, as well as readjustment after each nozzle change.

It is therefore an object of the present invention to provide another way of changing the nozzle.

SUMMARY OF THE INVENTION

This object is achieved according to the invention by a laser head as described hereinbelow.

According to the invention, the housing carries a cap-shaped nozzle head. The cap may in this case also have the shape of a hemisphere, which is attached to the housing of the laser head and is matched to it. Alternating nozzles are provided on the inside of the nozzle head, and are held on the wall of the nozzle head so that they are rotatable about a rotation axis obliquely at an angle to the laser axis and can be introduced into the beam path of the laser beam. When a nozzle is changed, the nozzle respectively needed for the next method step can thereby be rotated into the beam path without elaborate further adjustment and intervention being required on the nozzle head. The structure also then allows the automatic introduction of a nozzle, so that the set-up time is significantly reduced and the duration of unmanned operation is significantly extended.

According to a preferred refinement, the nozzles are arranged on a nozzle disk, the nozzle openings being arranged on the same radius relative to the rotation axis. Furthermore, a toothed ring may preferably be provided outside on the nozzle disk, so that the nozzle disks can be adjusted by means of a positioning motor.

In order to achieve the desired accuracy when adjusting the nozzle, the shape of the nozzle disk is matched to the shape of the spherical cap-shaped nozzle head and lies flat on the inside of the nozzle head with an equal radius of curvature.

The nozzle head in this configuration, for example as a stable hemisphere, protects against damage the nozzle disk or the nozzles which were always the first to suffer from collisions with the material being cut, owing to the nozzles being exposed.

In order to change the nozzles, the nozzle head needs to be removed from the housing and put back again. To this end, for example, a corresponding fine screw thread or a snap fastening may be provided. Irrespective of this, however, each change of the nozzle head requires readjustment of the nozzles with the laser beam, since variations are to be expected with such small dimensions every time the nozzle head is changed. According to another preferred refinement, the wall of the nozzle head therefore contains an eccentric disk which is rotatable about an axis and carries the rotation axis of the nozzle disk eccentrically relative to this axis. By rotating this eccentric disk (x axis) and by rotating the nozzle disk (y axis), after changing the nozzle head it is possible to bring a nozzle of the nozzle disk with the nozzle center exactly in an axis with the laser beam. For this, the nozzle opening is first brought by rotating the eccentric disk onto the circle line on which the centers of the other nozzle openings lie. The lateral offset and therefore the final overlap are then achieved by rotating the nozzle disk. This position can thereby be established as a zero point for the automatic nozzle change. During the subsequent rotation of the nozzle disk to change the nozzles, no further adjustment is necessary since all the nozzles on the nozzle disk are aligned exactly with the laser beam.

According to a further refinement of the laser head, the cap opening for the path of the laser beam is larger than the nozzle diameter. The positive pressure in the interior between the nozzle head and the housing therefore presses the nozzle disk onto the wall of the nozzle head from the inside, and seals it.

According to a preferred refinement, the inlet channels provided in the housing for the working gas are arranged offset relative to the longitudinal axis of the beam space. This achieves controlled turbulence of the working gas as it is blown in.

In the space formed by the nozzle head following on from the housing, in order to prevent uncontrolled turbulence in the otherwise nonuniform space, the housing comprises an opening funnel which ends at a very short distance before the nozzle disk.

With the laser head configured according to the invention, and especially the nozzle head, automatic changing of different nozzle sizes can therefore be carried out after the one-off adjustment. Only when the nozzle head is fitted on the housing again must the basic adjustment take place once more. To this end, the likewise spherical cap-shaped eccentric disk, which carries the rotation axis for the nozzle disk, is correspondingly rotated after fitting the nozzle head. This may, for example, be done from the outside using an appropriate positioning screw.

The invention makes it advantageously possible to carry out an automatic center determination by arranging a photodiode in the space surrounded by the cap-shaped nozzle head. It is used to collect light scattered from reflection surfaces of a nozzle used for the automatic center determination. This nozzle expediently has a larger measuring bore than the working nozzles and is positioned roughly below the laser beam. Under full load, the laser beam is moved relative to the measuring bore along a line onto the two opposite edge regions of the measuring bore. This is done by rotating the eccentric disk (x axis) and rotating the nozzle disk (y axis). When the respective edge region is reached, the scattered light appears and is recorded by the photodiode. This is the instant for storing the position. From the two positions, the average value is determined and the two opposite edge regions of the measuring bore are subsequently scanned along a line which is perpendicular to the previous line and passes through the center. Here again, the instantaneous position is recorded by the resolution of the photodiode when the scattered light is detected at the edge of the measuring bore, and the average value is formed therefrom. This average value then represents the circle center of the measuring bore, through which all the nozzle openings will then pass when the nozzle disk is rotated. The particular advantage of this adjustment is that the center determination can be carried out under a full load of the laser, since the laser beam behaves differently ("bends") under different powers. The scattered light to be recorded by the photodiode results from contact of the laser beam with the material of the measuring nozzle, which may become damaged due to the contact. Yet since it is only a measuring nozzle, this damage can be tolerated. Owing to the structure of the nozzle head and the multiplicity of different nozzles, one can be obviated. This may be done by appropriate software.

BRIEF DESCRIPTION OF THE DRAWINGS

The invention will be explained in more detail below with reference to the single FIGURE.

DETAILED DESCRIPTION

In a sectional representation, the FIGURE shows the nozzle-side end of a laser head 18 with the housing 16 and a hemispherical nozzle head 8 screwed onto the housing. In the known way, the laser beam 11 travels onto a lens 6 and is focused from there through the conical beam space 14 formed by the tip 9, symmetrically relative to the longitudinal axis 17 onto the material 4. The flow channels 1 opening into the beam space 14 are arranged for blowing in the working gas so that their axes do not intersect the longitudinal axis 17. A photodiode for detecting scattered light in the beam space 14' may, for example, be arranged on the housing 16 on the horizontal surface above the tip 9 in the nozzle disk 5 on the left in the FIGURE. As mentioned above, the scattered light is generated by reflections on the edge of a nozzle 13 with enlarged hole diameter to be provided separately for this. The scattered light striking the photodiode starts the recording of the instantaneous position.

The nozzle head 8 is fastened on the housing 16 using a screw thread 7. At the lower end, the nozzle head has an opening 12 which is closed by a nozzle disk 5, which in turn comprises a multiplicity of different nozzles 13. The opening 12 is substantially larger than the opening of a nozzle 13. In the wall 20 of the nozzle head 8, there is a preferably spherical cap-shaped eccentric disk 15, which is mounted so that it can rotate about an axis 19 and comprises the rotation axis 10 for the nozzle disk 5, offset relative to the center of the eccentric disk 15. Both the axis 19 and the rotation axis 10 are inclined obliquely at an angle relative to the axis 17 of the laser beam 11. In the exemplary embodiment, the angles are about 20°. The nozzle disk 5 is matched in terms of its curvature to the curvature of the nozzle head 8 and comprises a toothed ring in the exemplary embodiment, in which the drive wheel 3 of a positioning motor 2 engages. Using the positioning motor 2, the nozzle required for the next process step can then be brought into the laser beam 11.

What is claimed is:

1. A laser head for a laser processing machine comprising:
    a housing defining a conical beam space and an axis of a laser beam;
    a cup-shaped nozzle head mounted on the housing having an opening aligned with the conical beam space;
    a nozzle disk mounted for rotational movement around a nozzle disk axis relative to the nozzle head, wherein the nozzle disk comprises at least two nozzles and rotation of the nozzle disk selectively positions the at least two nozzles between the conical beam space and a nozzle head opening; and,
    an eccentric disk rotatably mounted relative to the nozzle head around an eccentric disk axis, wherein the eccentric disk carries the nozzle disk axis in a position spaced from the eccentric disk axis and rotation of the eccentric disk relative to the nozzle head laterally moves the nozzle disk axis and thereby, the nozzle disk.

2. The laser head as claimed in claim 1, wherein the nozzle disk is shaped on a side facing an inside of the nozzle head according to the curvature of the nozzle head.

3. The laser head as claimed in claim 1, wherein the nozzle disk is rotated by a positioning motor.

4. The laser head as claimed in claim 1, wherein the nozzle head opening for the path of the laser beam is larger than the at least two nozzles.

5. The laser head as claimed in claim 1, including inlet channels in the housing for blowing working gas into the conical beam space so that axes of the inlet channels do not intersect the longitudinal axis of the beam space.

6. The laser head as claimed in claim 1, wherein the at least two nozzles are arranged on the nozzle disk with an equal radius around the rotational movement and lateral movement of the nozzle disk.

7. The laser head as claimed in claim 1, wherein the nozzle head is screwed onto the housing.

8. The laser head as claimed in claim 1, wherein the nozzle disk axis and the center axis of the eccentric disk are inclined obliquely relative to the axis of the laser beam and the beam space.

\* \* \* \* \*

UNITED STATES PATENT AND TRADEMARK OFFICE
CERTIFICATE OF CORRECTION

PATENT NO.       : 7,619,180 B2
APPLICATION NO. : 10/557000
DATED            : November 17, 2009
INVENTOR(S)      : Reinhard Diem It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Fourteenth Day of December, 2010

David J. Kappos
*Director of the United States Patent and Trademark Office*